Patented Oct. 30, 1934

1,978,949

UNITED STATES PATENT OFFICE 1,978,949

PROCESS FOR PRODUCTION OF DIPHENYLOL-PROPANE

Siegfried Kohn and Edward Schub, Philadelphia, Pa., assignors to Röhm & Haas Company, Inc., Philadelphia, Pa.

No Drawing. Application August 27, 1930, Serial No. 478,286

12 Claims. (Cl. 260—154)

This invention relates to the production of 4', 4 dihydroxy B, B, diphenyl propane by a new process which constitutes a marked improvement in the art. Hereinafter the diphenylol propane referred to is to be understood to be 4', 4 dihydroxy B, B, diphenyl propane.

The process for the production of diphenylol-propane by condensation of phenol and acetone with the aid of an acid such as HCl, $H_2SO_4$, etc. as condensation agent, is well-known and it is also well known that this process suffers from two serious drawbacks: (See Dianin 1892 Ber. 25. R. 334 and Beatty U. S. Patent 1,225,750):

1. The diphenylol-propane obtained is contaminated with remnants of unused phenol and with products of side reactions, necessitating a tedious and expensive purification. The reaction proceeds very slowly, requiring several days for its completion.

2. On account of the continuous removal of unused phenol by the diphenylol-propane, the reaction finishes with a poor yield. Under certain conditions, only two-thirds of the phenol are transformed into the desired product; one-third separates out as such, adhering strongly to the diphenylol-propane crystals. The recovery of this fraction of phenol is expensive and fraught with technical difficulties.

It is the combination of these two drawbacks, one or the other prevailing according to the varying conditions under which the condensation is carried out (choice of acid or mixtures of acids, strength of acids, temperature, time degree of stirring), which heretofore made the diphenylol-propane an expensive commodity, the use of which was restricted because of the lack of a process which would make possible its manufacture at a cost only moderately higher than the cost of the raw materials used in its production. The discovery of such a process is the subject of this patent application.

By systematic investigation of the two difficulties, more especially by the observation that the use of an increasing excess of phenol reduces the extent of the side reactions (resinification and sulphonation), the idea was conceived that if the excess phenol could be replaced by an ingredient not participating in the reaction, the same protection against side reactions would be obtainable without jeopardizing the yield. It was further reasoned that the non-reactive ingredient should preferably not be a powerful solvent of diphenylol-propane, so as not to prevent the continuous removal of the latter from the reaction mixture. As third desirable specification for the reagent to be selected appeared a fairly good dissolving power for phenol, which would enable it to remove phenol from the diphenylol-propane crystals as soon as deposited. As a further requirement it appeared desirable that the non-reactive ingredient should not be too volatile nor too high-boiling, the former because of losses during the reaction, the latter because of difficulties in its removal by drying.

We found that toluol, for instance, is a suitable ingredient because it fulfills the four requirements quite well. Under special conditions, benzol may be preferable, or solvent naphtha, etc., depending upon the equipment (whether open vessels or vessels with reflux condensers are used) and upon the specification for the finished product (whether it can be used wet or must be entirely freed from water and solvents).

Not only does our process meet the objections of the old but has the further advantage of considerably reducing the time required by completing the reaction in less than 24 hours.

Example 1

163 parts of phenol, 55 parts of acetone and 800 parts of sulphuric acid 58° Bé. are continually stirred and the temperature is kept at 30–35° C. After 3 hours, 10 parts of toluol are added and the reaction continued until practically all of the phenol (over 90%) is transformed into diphenylol-propane.

With fairly good stirring, this can be accomplished in about 18 hours. The finished product, after washing with water and drying, is of an unusual degree of purity; it is especially practically free from phenol.

Example 2

163 parts of phenol, 50 parts of acetone, and 700 parts of sulphuric acid of 58.5 Bé. are continually stirred and the temperature is kept at 35–40° C. After 1 hour, 15 parts of benzol are added and the reaction continued until practically all of the phenol is transformed into diphenylol-propane. With good stirring, this can be accomplished in about 12 hours.

Example 3

163 parts of phenol, 52 parts of acetone, and 750 parts of sulphuric acid of 59° Bé. are continually stirred and the temperature kept at 40–45° C. After 1 hour, about 5 parts of solvent naphtha are added and the reaction continued until practically all of the phenol is transformed into diphenylol-propane.

In place of toluol, benzol and solvent naphtha, gasoline, petroleum naphthas, and other inert diluents may be used with satisfactory results.

In all instances, the product is freed from acid by washing with water and afterwards freed from coloring matter by washing with weak alkali solution, which latter is removed by another thorough washing with water.

The proportions, temperature, etc., can be varied without departing from the spirit of the invention.

Our claim is the improvement of a well-known process by the addition of an ingredient not participating in the reaction, but having such properties as to enable the reaction to give both a good yield and a pure product. Up to now it was only possible to obtain a fairly good yield and an impure product, or a poor yield and a pure product.

What we claim is:

1. A process for the production of 4', 4 dihydroxy B, B, diphenyl propane which comprises reacting phenol, acetone, and an acid condensation agent in the presence of an inert diluent.

2. A process for the production of 4', 4 dihydroxy B, B, diphenyl propane which comprises reacting phenol, acetone and sulphuric acid condensation agent in the presence of an inert diluent.

3. A process for the production of 4', 4 dihydroxy B, B, diphenyl propane which comprises reacting phenol, acetone, and an acid condensation agent in the presence of liquid hydrocarbons.

4. A process for the production of 4', 4 dihydroxy B, B, diphenyl propane which comprises reacting phenol, acetone, and an acid condensation agent in the presence of toluol.

5. A process as described in claim 4 in which sulphuric acid is the acid ingredient.

6. A process for the production of 4', 4 dihydroxy B, B, diphenyl propane which comprises reacting phenol, acetone, and an acid condensation agent in the presence of benzol.

7. A process as described in claim 6 in which sulphuric acid is the acid ingredient.

8. The process for the production of 4', 4 dihydroxy B, B, diphenyl propane which comprises reacting phenol, acetone, and an acid condensation agent in the presence of a solvent derived from petroleum oils.

9. The process for the production of 4', 4 dihydroxy B, B, diphenyl propane which comprises reacting phenol, acetone, and an acid condensation agent in the presence of an inert volatile diluent.

10. The process for the production of 4', 4 dihydroxy B, B, diphenyl propane which comprises reacting phenol, acetone, and an acid condensation agent in the presence of a volatile liquid hydrocarbon.

11. The process for the production of 4', 4 dihydroxy B, B, diphenyl propane which comprises reacting phenol, acetone, and an acid condensation agent in the presence of an aromatic volatile liquid hydrocarbon.

12. The process for the production of 4', 4, dihydroxy B, B, diphenyl propane which comprises reacting phenol, acetone, and an acid condensation agent in the presence of an aliphatic volatile liquid hydrocarbon.

SIEGFRIED KOHN.
EDWARD SCHUB.